US008827727B2

(12) United States Patent
Yang et al.

(10) Patent No.: US 8,827,727 B2
(45) Date of Patent: Sep. 9, 2014

(54) DUAL MEMORY CARD TYPE SOCKET

(71) Applicant: Molex Incorporated, Lisle, IL (US)

(72) Inventors: In-Chol Yang, Ansan (KR); In-Ho Yoo, Ansan (KR)

(73) Assignee: Molex Incorporated, Lisle, IL (US)

( * ) Notice: Subject to any disclaimer, the term of this patent is extended or adjusted under 35 U.S.C. 154(b) by 78 days.

(21) Appl. No.: 13/657,274

(22) Filed: Oct. 22, 2012

(65) Prior Publication Data

US 2013/0102170 A1   Apr. 25, 2013

(30) Foreign Application Priority Data

Oct. 21, 2011   (KR) .................. 10-2011-0107824

(51) Int. Cl.
*H01R 13/62*   (2006.01)
(52) U.S. Cl.
USPC ........................................... 439/153
(58) Field of Classification Search
USPC .......... 439/152–160, 630, 923; 361/801–803, 361/737, 756, 684
See application file for complete search history.

(56) References Cited

U.S. PATENT DOCUMENTS

| 6,382,991 | B2* | 5/2002 | Kumakura et al. | 439/157 |
| 6,587,348 | B2* | 7/2003 | Kondo | 361/741 |
| 7,753,702 | B2* | 7/2010 | Wu et al. | 439/157 |
| 7,903,152 | B2* | 3/2011 | Kim | 348/231.99 |
| 8,107,258 | B2* | 1/2012 | Chang | 361/801 |
| 8,197,272 | B2* | 6/2012 | Matsunaga | 439/160 |
| 2010/0099283 | A1* | 4/2010 | Wu et al. | 439/153 |
| 2012/0009808 | A1* | 1/2012 | Matsumoto et al. | 439/153 |

FOREIGN PATENT DOCUMENTS

| KR | 2005-0100874 A | 10/2005 |
| KR | 2005-0100875 A | 10/2005 |
| KR | 2009-0129894 A | 12/2009 |

* cited by examiner

*Primary Examiner* — Jean F Duverne
(74) *Attorney, Agent, or Firm* — Timothy M. Morella

(57) ABSTRACT

The Present Disclosure has the effect of maximizing space utilization in the internal space of the socket during mounting/unmounting. In addition, the Present Disclosure enables attachment/removal within a minimal space, because the extraction stroke for a first memory card is so short. Also, the Present Disclosure can reduce the total socket height because the second memory card contact terminal and the first memory card contact terminal alignments do not overlap. Furthermore, the Present Disclosure has the advantage that cellular telephone OS errors do not occur, because the second memory card cannot be removed at will when the mobile communication terminal is powered on, with battery installed.

18 Claims, 6 Drawing Sheets

DUAL MEMORY CARD TYPE SOCKET

REFERENCE TO RELATED APPLICATIONS

The Present Disclosure claims priority to prior-filed Korean Patent Application No. 2011-0107824, entitled "Dual Memory Card Type Socket," filed on Oct. 21, 2011 with the Korean Intellectual Property Office. The content of the aforementioned Patent Application is incorporated in its entirety herein.

BACKGROUND OF THE PRESENT DISCLOSURE

The Present Disclosure relates, generally, to a dual memory card type socket, and, more specifically, to a dual memory card type socket wherein a memory card, such as, for example, a micro SIM card or a micro SD card, may be inserted and removed in the same direction.

Generally, mobile communication terminals are furnished with both a memory card that enables personal information and credit payments to be authenticated and a memory card for storing data associated with various forms of content. Among memory cards, memory cards used to authenticate personal information and credit transactions include SIM cards, RUIM cards, Moneta cards and BankOn cards; whereas memory cards used for storing content include micro-SD cards, smart media cards, memory sticks, XD Pitch cards and T-Flash cards.

Among memory cards, SIM cards used for authentication for personal information and credit transactions are mounted to the surface of the back case, to which the battery pack is attached, in order to reduce the risk of loss. This makes it impossible to replace them without removing the battery pack from the mobile communications terminal. By contrast, memory cards used to store data are mounted on the side of the mobile communications terminal, so that they can be replaced easily.

Conventionally, separate sockets were fabricated for affixing and connecting both authentication and data memory cards, so that each was mounted to the appropriate location on the mobile terminal. As mounting space is needed for mounting each memory socket, this posed difficulties for the slimming and miniaturization of mobile terminals, and furthermore imposed limits on the installation of parts for adding new functionality.

To resolve these issues, dual memory card type sockets are being developed that can affix and accept both certification and data memory cards in a single memory socket. Examples include the "Dual Connection Device for Memory Medium Connection and Mobile Communication Terminal with The Same" disclosed in Korean Patent Application Nos. 2005-0100874 and 2005-0100875, the contents of which are hereby incorporated in their entireties herein.

In addition, the dual memory card type socket of the mobile terminal disclosed in Korean Patent Application No. 2008-0054040, the content of which is hereby incorporated in its entirety herein, is a mobile terminal memory socket to which a memory card is connected. The socket generally includes a housing formed with receiving spaces stacked vertically in order to receive the memory card, from front to back, to the right of the insertion direction of the card; a conductive upper and lower cover covering the respective receiving spaces; memory card contact terminals, one to contact the card within the upper receiving space, and another positioned by insertion to the left of the card insertion direction in order to connect the card within the lower receiving space; and a locking means that locks the card in place and comprises a heart cam, coil spring and pin rod. The card is inserted from the right side, perpendicular to the insertion direction thereof. The heart cam comprises a locking part and a body on which a guide groove is formed. The guide groove comprises a $1^{st}$ through $4^{th}$ zone through which the pin rod moves, an upper boundary edge that traverses the zones, and a lower boundary edge. The upper boundary edge is formed sharp on the left side and projects past the lower boundary edge to the left, while the lower boundary edge projects to the right. Zones 3-4 are configured on the same plane, and a triangular sloped surface is formed between them to prevent improper actuation of the heart cam.

However, conventional dual memory card type sockets are limited in the use of space during cellular telephone design, due to the additional need for space outside the socket when inserting and/or removing the card, because the insertion directions of the memory cards are at a 90° angle. There are technical limits on the extent to which the overall socket height can be reduced by overlapping the card contact terminals, and if a memory card is abruptly removed when the cellular telephone is powered on, with battery installed, or if it falls out, this will cause errors in the cellular telephone Operating System (OS).

SUMMARY OF THE PRESENT DISCLOSURE

The Present Disclosure is intended to resolve the problems described above, and to provide a dual memory card type socket wherein the utilization of space is maximized when inserting and/or removing (that is, coupling and/or decoupling) within the internal space of the socket, and the total socket height can be reduced because the card contact terminals do not interfere with one another. Further, insertion and/or removal can occur even in a minimal space because the extraction stroke for insertion and/or removal of a memory card is short, and cellular telephone OS errors do not occur because the card cannot be removed or separated at will when the mobile communication terminal (i.e., the cellular telephone) is powered on (with battery installed).

To achieve the objective described above, the dual memory card type socket of the Present Disclosure comprises a housing whereon an aperture is formed on the front side so as to enable insertion and removal of an authentication memory card, such as a micro SIM card, from the interior, and an authentication memory card contact terminal mounting part formed on one side while a storage memory card (such as a micro SD card) contact terminal mounting part is formed on the other side; a plurality of authentication memory card contact terminals that couple to the authentication memory card contact terminal mounting part, wherein on one side it contacts the connection terminal of the authentication memory card and on the other side it is locked to the printed circuit board; a plurality of storage memory card contact terminals coupled to the storage memory card contact terminal mounting part, one side whereof contacts the connection terminal of the storage memory card and the other side whereof is locked to the printed circuit board; an authentication memory card shell coupled to the top of the housing to form a space for insertion of the authentication memory card thereinto, and on either side of the top whereof a guide tab is formed to guide the storage memory card; and a storage memory card shell positioned higher than the authentication memory card shell and coupled to the rear of the housing to form a space for insertion of the authentication memory card therewithin, and wherein an aperture is formed in the front to enable the insertion and extraction of the storage memory card within the space. The structure thereof is formed so that the insertion spaces for the authentication memory card and the storage memory card are stacked vertically, and the cards are inserted and extracted in the same direction.

Additionally, on one side of the top of the authentication memory card shell, a locking path is formed coupled to the locking groove formed on the side of the storage memory card. Further, on either side of the bottom of the housing, a welding hole is formed to weld the authentication memory card contact terminal. Also, a locking projection is formed on either side of the housing so that the authentication memory card shell can be coupled to the housing, and a locking hole is formed on either side of the authentication memory card shell, corresponding to the locking projections.

As described above, the Present Disclosure has the effect of maximizing the use of space when attaching and during removal (i.e., coupling and separating) within the socket interior. In addition, the Present Disclosure enables attachment and removal within a minimal space, because the extraction stroke for the storage memory card is so short. Further, the Present Disclosure can reduce the total socket height because the authentication memory card contact terminal and storage memory card contact terminal alignments do not overlap. Also, the Present Disclosure has the advantage that cellular telephone OS errors do not occur because the authentication memory card cannot be removed at will when the mobile communication terminal (that is, the cellular telephone) is powered on, with battery installed. Finally, the Present Disclosure can effectively prevent improper operation and system errors by preventing the contact terminal of the authentication memory card and contact terminal of the storage memory card from making electrical contact, by preventing improper insertion of the authentication memory card.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
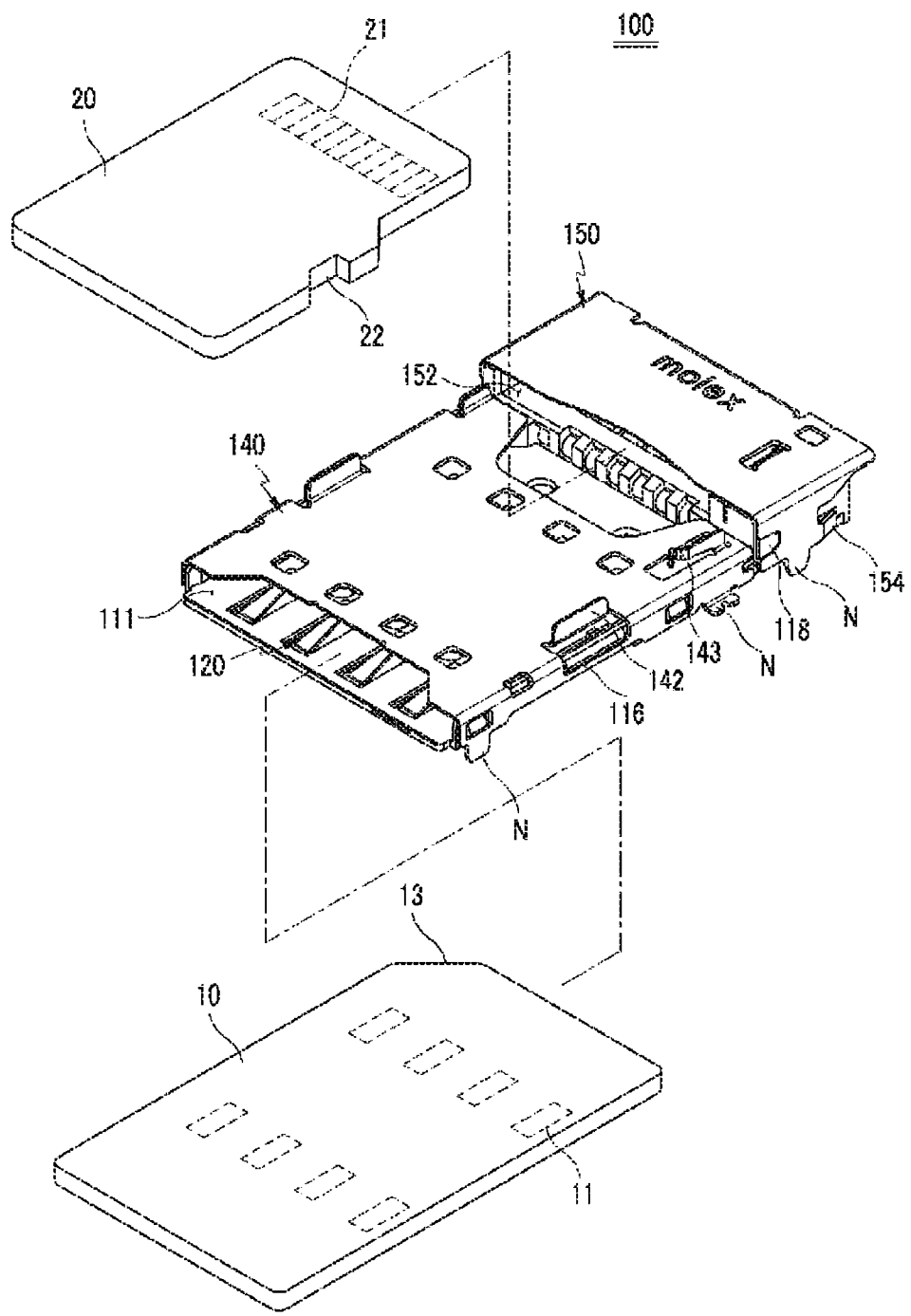
FIG. 1 is an oblique view of a dual memory card type socket according to the Present Disclosure.
Figure 2:
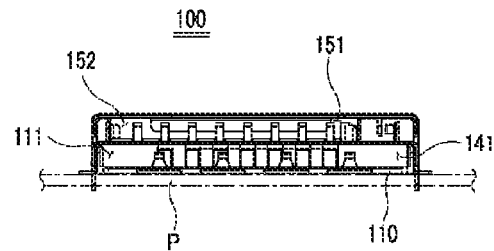
FIG. 2 is a frontal view of FIG. 1.
Figure 3:
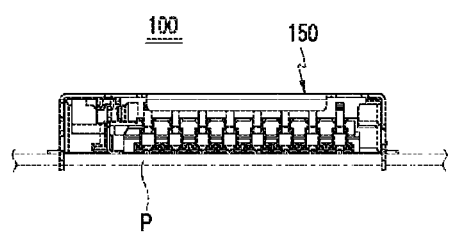
FIG. 3 is a rear view of FIG. 1.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, the dual memory card type socket 100, according to an embodiment of the Present Disclosure, has an insertion/removal structure wherein authentication memory cards, such as micro SIM cards, 10 and storage memory cards, such as micro SD cards 20, are inserted and removed. For clarity, "authentication memory card" and "micro SIM card" are used interchangeably in the Present Disclosure. It is to be understood that "micro SIM card" is an example of an "authentication memory card," and it not intended to limit the scope thereof. In the same vein, and also for clarity, "for memory card" and "micro SD card" are used interchangeably in the Present Disclosure. It is to be understood that "micro SD card" is an example of a "storage memory card," and it not intended to limit the scope thereof.

The dual memory card type socket 100 is configured with the micro SIM card and micro SD card insertion spaces 141, 151, respectively, being stacked vertically, and the directions of insertion/removal for the micro SIM card 10 and the micro SD card 20 are a single direction. The dual memory card type socket is of course applicable to SIM cards and SD cards, as well as micro SIM and micro SD cards.

The dual memory card type socket 100 is furnished with a housing 110 whereon an aperture 111 is formed on the front side to enable insertion/removal of the micro SIM card 10 thereinto/therefrom, and a micro SIM card contact terminal mounting part 112 is formed on one side, while on the other side a micro SD card contact terminal mounting part 113 is formed. The micro SIM card contact terminal mounting part 112 is placed further forward than the micro SD card contact terminal mounting part 113. When used, the "micro SIM card contact terminal mounting part 112" refers to the part where the micro SIM card contact terminal 120 is coupled. Detector switch terminals 161, 162 are installed at the rear end of the housing 110, so as to be able to detect the insertion/removal of the micro SIM card 10 and the micro SD card 20.

A plurality of micro SIM card contact terminals 120 can be coupled to the micro SIM card contact terminal mounting part 112 by overmolding. It is also possible for them to be coupled or fastened by an interference fit method or assembly method, or a conventional fastening means such as an adhesive. One side of the micro SIM card contact terminal 120 connects to the connection terminal 11 of the micro SIM card 10, and the other side is soldered to a printed circuit board P.

The micro SD card contact terminal mounting part 113 is formed as a plurality of slots S, and a plurality of micro SD card contact terminals 130 are coupled to said slots S. On either side of the bottom of the housing 110, solder holes 115 are formed for welding the micro SIM card contact terminals 120. Because the micro SIM card contact terminals 120 are soldered via the solder holes 115, the solder part may be placed within the socket 100 to minimize the socket mounting space. One side of the micro SD card contact terminal 130 connects to the connection terminal 21 of the micro SD card 20, and the other side is soldered to a printed circuit board P.

A micro SIM card shell 140 is coupled to the top of the housing 110, forming an insertion space 141 for inserting the micro SIM card 10 into the housing 110. A locking projection 116, 117 is formed on either side of the housing 110, to enable the micro SIM card shell 140 to couple to the housing 110, and a locking hole 144, 145 is formed on either side of the micro SIM card shell 140, corresponding to the locking projections 116, 117.

On either side of the top of the micro SIM card shell 140, a guide tab 142 is formed in order to guide the micro SD card 20. The guide tab 142 is formed by cutting away a portion of the micro SIM card shell 140. On one side of the top surface of the micro SIM card shell 140, a locking tab 143 is formed by cutting away. The locking tab 143 is coupled to the locking groove 22 formed on the side of the micro SD card 20. The micro SD card shell 150 is coupled to the rear of the housing 110.

On either side of the housing 110 is formed a locking projection 118 and locking groove 119, to enable coupling of the micro SD card shell 150 to the rear of the housing 110. Corresponding to these, a locking groove 151 and a locking tension projection 152 are formed on either side of the micro SD card shell 150. The micro SD card shell 150 is positioned higher with respect to the micro SIM card shell 140. An insertion space 151, for inserting the micro SD card 20, is formed therewithin. The micro SD card shell 150 has an aperture 152 formed on its front surface so that a micro SD card 20 can be inserted/extracted into/from the insertion space 151. A plurality of dips N are formed on either side of the micro SIM card shell 140 and the micro SD card shell 150.

In addition, an improper insertion prevention face 13 is formed on one side of the forward edge of the micro SIM card 10 to prevent improper insertion of the micro SIM card 10, and an improper insertion prevention bump 110a is formed inside the housing 110, corresponding to the improper insertion prevention face 13. Accordingly, the improper insertion prevention bump 110a and improper insertion prevention face 13 permit the micro SIM card 10 to be inserted in only the one specified direction. If the micro SIM card 10 is inserted improperly due to user carelessness, the improper insertion prevention bump 110a hinders the insertion of the micro SIM card 10, thus preventing electrical contact of the micro SIM card contact terminals 120 with the connection terminals 11 of the micro SIM card 10, as a result preventing system errors or malfunction.

Figure 9:
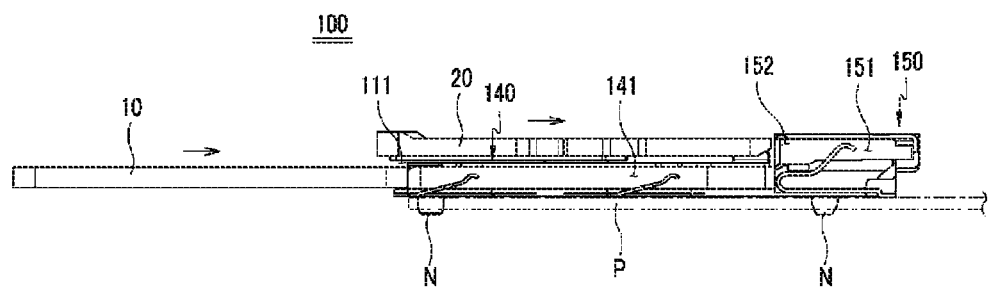
FIG. 9 is a longitudinal section showing the dual memory card type socket of the Present Disclosure, prior mounting an authentication memory card and a storage memory card.
Figure 10:
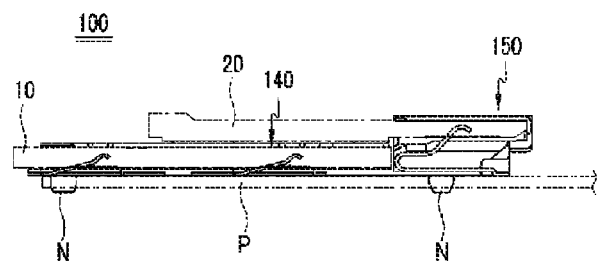
FIG. 10 is a longitudinal section showing the dual memory card type socket of the Present Disclosure, when the authentication and storage memory cards have been mounted.

In operation, a micro SIM card 10 is inserted into the insertion space 141 via the aperture 141. The connection terminal 11 of the micro SIM card 10 elastically contacts the connection terminal 11 of the micro SIM card 10 (see FIGS. 9-10).

Figure 4:
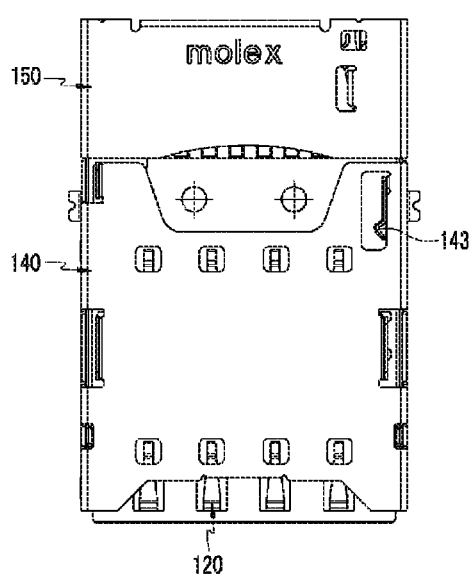
FIG. 4 is an overhead view of FIG. 1.
Figure 5:
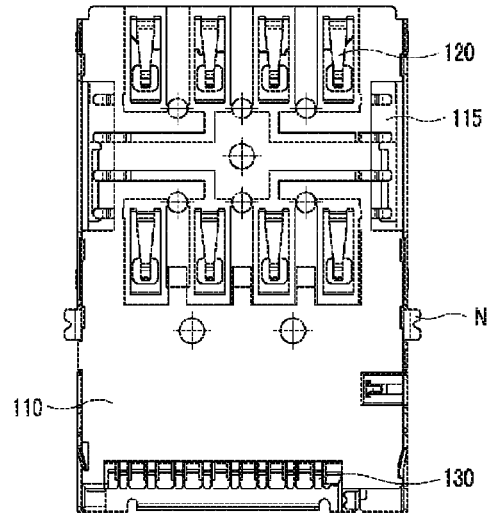
FIG. 5 is a bottom view of FIG. 1.
Figure 6:
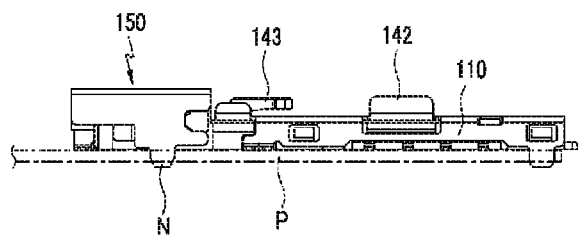
FIG. 6 is a left-side view of FIG. 1.
Figure 7:
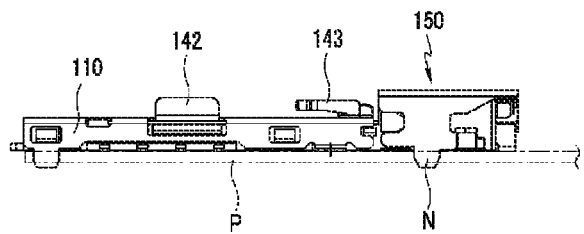
FIG. 7 is a right-side view of FIG. 1.
Figure 8:
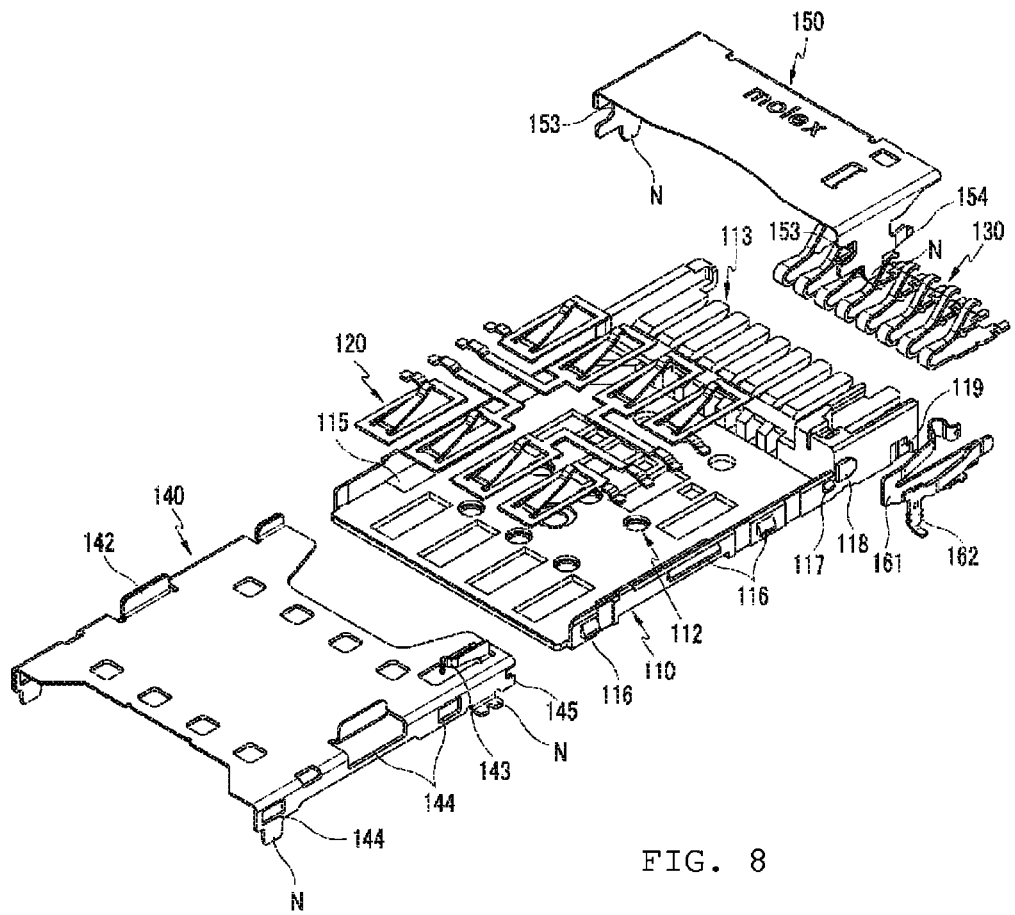
FIG. 8 is an exploded oblique view of another dual memory card type socket according to the Present Disclosure.

A micro SD card 20 is inserted into the insertion space 151 via the aperture 151. The micro SD card 20 is then kept level and horizontal during insertion by means of the guide tab 142 (see FIG. 1), thus preventing an improper electrical connection. The locking tab 143 (see FIGS. 1 and 4) couples flexibly to the locking groove 22 of the micro SD card 20, locking the micro SD card 20 in place.

Figure 12:
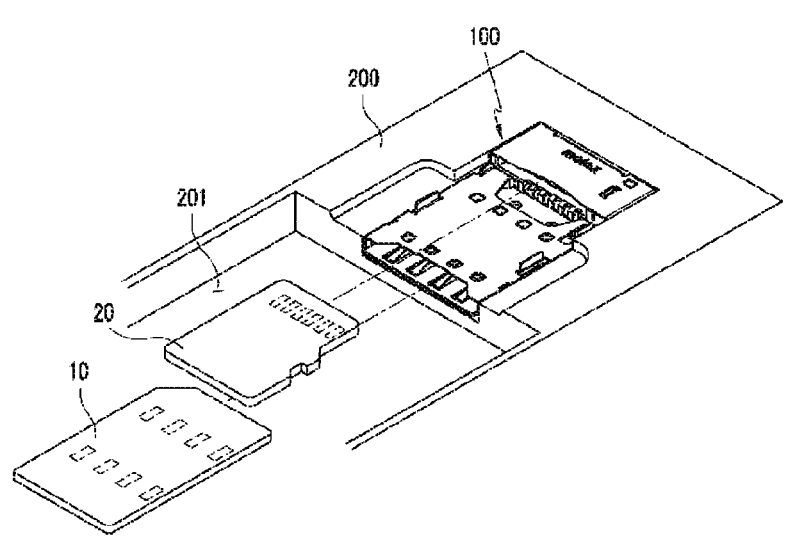
FIG. 12 is an oblique view showing the dual memory card type socket of the Present Disclosure mounted within the battery mounting space of a mobile communication terminal.
Figure 13:
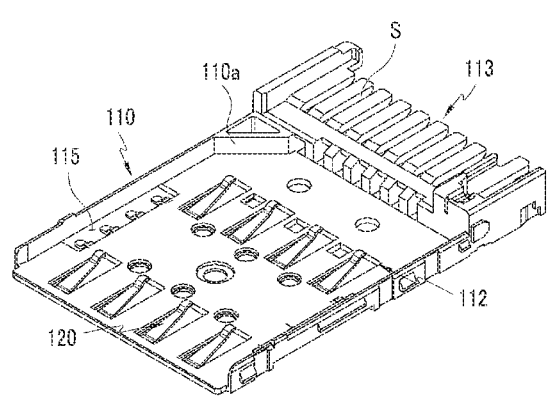
FIG. 13 illustrates the overmolding of an authentication memory card contact terminal.

The detector switch terminals 161, 162 are contacted to the micro SIM card 10 and the micro SD card 20, and act to detect the insertion/removal of the micro SIM card 10 and the micro SD card 20. The battery B is mounted within the battery mounting space 201 formed on the reverse of the mobile communication terminal 200 (see FIG. 12).

Figure 11:
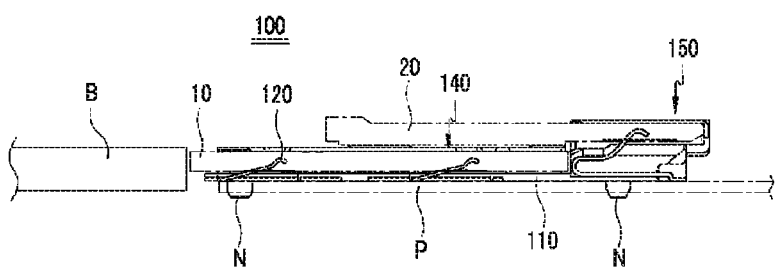
FIG. 11 is a longitudinal section showing the dual memory card type socket of the Present Disclosure, illustrating the structure that prevents authentication memory card removal.

To prevent removal of the micro SIM card 10 when the mobile communication terminal is powered on, with battery installed, the micro SIM card 10 is blocked by the battery B so that it cannot be extracted unless the battery B is removed, by which means OS errors during cellular telephone operation can be effectively prevented (see FIG. 11). Because the micro SD card 20 is not blocked by the battery B, it can be freely extracted/inserted (see FIG. 11).

As described hereinabove, the Present Disclosure has the effect of maximizing the utilization of space when mounting/unmounting (coupling/separating) a micro SIM card and micro SD card. In addition, the Present Disclosure enables attachment/removal within a minimal space, because the extraction stroke for the micro SD card is so short. Also, the Present Disclosure can reduce the total socket height because the alignments of the micro SIM contact terminals and micro SD card contact terminals do not overlap. Finally, the Present Disclosure has the advantage that cellular telephone OS errors do not occur, because the micro SIM card cannot be removed at will when the mobile communication terminal is powered on (with battery installed).

While a preferred embodiment of the Present Disclosure is shown and described, it is envisioned that those skilled in the art may devise various modifications without departing from the spirit and scope of the foregoing Description and the appended Claims.

What is claimed is:

1. A dual memory card type socket, comprising:
   a housing, whereon an aperture is formed on the front side so as to enable insertion and removal of an authentication memory card, the housing including an authentication memory card contact terminal mounting part formed on one side and a storage memory card contact terminal mounting part formed on another side;
   a plurality of authentication memory card contact terminals coupled to the authentication memory card contact terminal mounting part, wherein on one side the authentication memory card contact terminals contact the connection terminal of the authentication memory card, and on the other side the authentication memory card contact terminals are locked to the printed circuit board;
   a storage memory card shell coupled to the top of the housing to form a space for insertion of the storage memory card into the housing, on either side of the top thereof a guide tab is formed to guide the authentication memory card; and
   an authentication memory card shell positioned higher than the storage memory card shell and coupled to the rear of the housing to form a space for insertion of the authentication memory card therewithin, an aperture being formed in the front to enable the insertion and extraction of the authentication memory card within the insertion space;

wherein the insertion spaces for the storage memory card and the authentication memory card are stacked vertically, and the storage memory card and the authentication memory card are inserted and extracted in the same direction.

2. The dual memory card type socket of claim 1, wherein detector switch terminals are installed on the rear end of the housing to sense the insertion and removal of the storage memory card and the authentication memory card.

3. The dual memory card type socket of claim 2, having a structure wherein on one side of the top surface of the storage memory card shell, a locking tab is formed by cutting away, coupling to the locking groove formed on the side of the authentication memory card.

4. The dual memory card type socket of claim 1, having a structure wherein on one side of the top surface of the storage memory card shell, a locking tab is formed by cutting away, coupling to the locking groove formed on the side of the authentication memory card.

5. The dual memory card type socket of claim 1, wherein on either side of the bottom of the housing is formed solder holes for welding the storage memory card contact terminals.

6. The dual memory card type socket of claim 1, wherein locking projections are formed on either side of the housing, and locking holes are formed on either side of the storage memory card shell, corresponding to the locking projections, to enable coupling of the storage memory card shell to the housing.

7. The dual memory card type socket of claim 6, having a structure wherein the storage memory card contact terminal is overmolded onto the housing.

8. The dual memory card type socket of claim 6, having a structure wherein the storage memory card contact terminal is assembled on the housing.

9. The dual memory card type socket of claim 1, having a structure wherein the storage memory card contact terminal is overmolded onto the housing.

10. The dual memory card type socket of claim 1, having a structure wherein the storage memory card contact terminal is assembled on the housing.

11. The dual memory card type socket of claim 1, wherein on either side of the housing is formed a locking projection and locking groove, to enable coupling of the authentication memory card shell to the rear of the housing, and a locking groove and locking tension projection are formed on either side of the authentication memory card shell.

12. The dual memory card type socket of claim 1, having a structure wherein an improper insertion prevention face is formed on one side of the front edge of the storage memory card so as to prevent improper insertion of the storage memory card, and an improper insertion prevention bump is formed on the inside of the housing, corresponding to the improper insertion prevention face.

13. A dual memory card type socket wherein a storage memory card and a authentication memory card are inserted and removed, and wherein storage memory card and authentication memory card insertion spaces are stacked vertically, and the directions of insertion and removal for the storage memory card and the authentication memory card are the same direction.

14. The dual memory card type socket of claim 13, furnished with:

a housing whereon an aperture is formed on the front side so as to enable insertion and removal of a storage memory card into and from the interior, and a storage memory contact terminal mounting part is formed on one side while a authentication memory card contact terminal mounting part is formed on the other side;

a plurality of storage memory card contact terminals coupled to the storage memory card contact terminal mounting part, wherein on one side it contacts the connection terminal of the storage memory card, and on the other side it is locked to the printed circuit board;

a plurality of authentication memory card contact terminals that couple to the authentication memory card contact terminal mounting part, one side contacts the connection terminal of the authentication memory card and the other side is locked to the printed circuit board;

a storage memory card shell coupled to the top of the housing so as to form a space for insertion of the storage memory card into the housing, and on either side of the top whereof a guide tab is formed to guide the authentication memory card; and a authentication memory card shell positioned higher than the storage memory card shell and coupled to the rear of the housing to form a space for insertion of the authentication memory card therewithin, and wherein an aperture is formed in the front to enable the insertion/extraction of the authentication memory card within the insertion space.

15. The dual memory card type socket of claim 14, having a structure wherein on one side of the top surface of the storage memory card shell, a locking tab is formed by cutting away, and is coupled to the locking groove formed on the side of the authentication memory card.

16. The dual memory card type socket of claim 14, wherein on either side of the bottom of the housing are formed solder holes for welding the storage memory card contact terminals.

17. The dual memory card type socket of claim 14, wherein locking projections are formed on either side of the housing, and locking holes are formed on either side of the storage memory card shell, corresponding to the locking projections, so as to enable coupling of the storage memory card shell to the housing.

18. The dual memory card type socket of claim 14, having a structure wherein an improper insertion prevention face is formed on one side of the front edge of the storage memory card to prevent improper insertion of the storage memory card, and an improper insertion prevention bump is formed on the inside of the housing, corresponding to the improper insertion prevention face.

* * * * *